Dec. 20, 1966    A. B. FORD    3,292,819
NUT TRANSFER APPARATUS HAVING TWO DISCHARGE
ASSISTANTS IN SERIES
Filed June 7, 1965
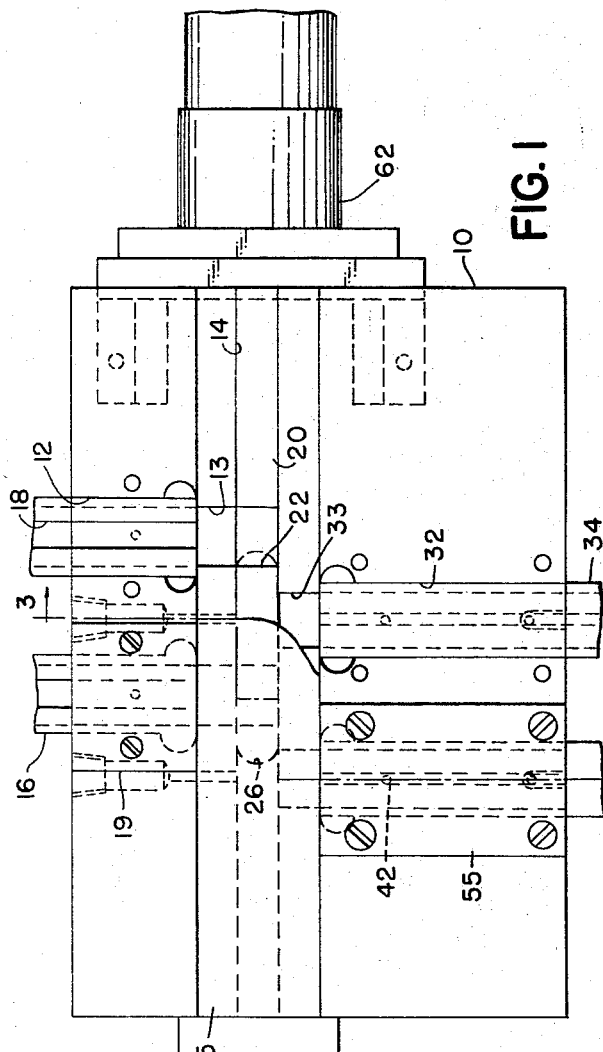
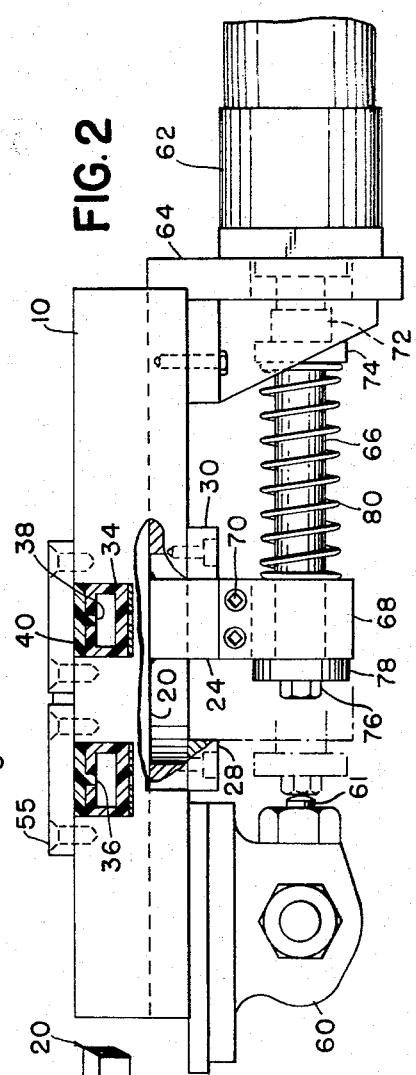
INVENTOR.
ARNOLD B. FORD
BY Whittemore,
Hulbert & Belknap
ATTORNEYS United States Patent Office 3,292,819
Patented Dec. 20, 1966

3,292,819
NUT TRANSFER APPARATUS HAVING TWO DISCHARGE ASSISTANTS IN SERIES
Arnold B. Ford, Livonia, Mich., assignor to Feedmatic-Detroit, Inc., Southfield, Mich., a corporation of Michigan
Filed June 7, 1965, Ser. No. 461,886
4 Claims. (Cl. 221—236)

The present invention relates to nut transfer apparatus, and more particularly, to apparatus adapted for feeding small parts such as nuts from a hopper to a plurality of delivery conduits by means of which the nuts are delivered to assembly equipment.

The present invention is an improvement over a nut transfer apparatus disclosed in Patent 3,163,324.

It is an object of the present invention to provide nut transfer apparatus designed to receive nuts advanced thereto, preferably by gravity, through a plurality of individual conduits, and to transfer single nuts from each of the conduits to delivery conduits associated therewith.

It is a further object of the present invention to provide transfer apparatus as described in the foregoing including pneumatic means for projecting individual nuts through the delivery conduits.

It is a further object of the present invention to provide transfer apparatus as described in the foregoing comprising means for timing the connection of air under pressure to the delivery conduit means to prevent premature application of air pressure thereto.

More specifically, it is a feature of the present invention to provide in combination with nut transfer apparatus, valve means for applying air to impel nuts through delivery conduits, and a transfer bar or shuttle movable to receive single nuts from input conduits and to transfer them into alignment with delivery conduits, and valve actuating mechanism movably connected for movement relative to the transfer bar to provide for valve actuation only after the transfer bar has completed its transfer movement and the valve actuating mechanism has been moved thereafter.

Other objects and features of the invention will become apparent as the description proceeds, especially when taken in conjunction with the accompanying drawing, illustrating a preferred embodiment of the invention, wherein:

FIGURE 1 is a plan view of the transfer apparatus.

FIGURE 2 is an elevational view of the transfer apparatus with parts broken away.

FIGURE 3 is a sectional view of the transfer apparatus, taken on the line 3—3, FIGURE 1.

FIGURE 4 is a perspective view of a transfer bar used in the apparatus.

Referring now to the drawing, the transfer apparatus comprises a manifold block 10 having a plurality of inlet passages or channels 12 communicating at their inner ends with reduced passages or channels 13 which in turn communicate with a longitudinally extending slot or groove 14 formed in the block. The open sides of the channels 13, the slot 14, and supply grooves or channels later to be described, are closed by an elongated strip 15 part of which is broken away in FIGURE 1. Each of the channels 12 receives an input or supply conduit or chute 16 which may be formed of metal such as extruded brass or the like, or plastic material. The conduits or chutes 16 are illustrated as provided with a longitudinally extending top opening 18 and are adapted to receive a series of nuts suitably hopper fed from conventional equipment. Overlying the channels 12 and the ends of the chutes 16 contained therein are individually removable cover plates 19.

The apparatus of the present invention removes a single nut from each of the supply chutes 16 and transfers them for delivery through delivery conduits leading to assembly equipment.

The slot 14, as best illustrated in FIGURE 3, receives a transfer bar 20, details of which are best shown in FIGURE 4. As seen in this figure the transfer bar is provided with a plurality of recesses 22 each dimensioned to receive a single nut and spaced apart so that each of the recesses may be positioned in alignment with the supply chutes 16. The transfer bar 20 includes a depending actuating portion 24 which extends through an opening 26 provided at the bottom of the slot 14. Bolted or otherwise suitably secured to the underside of the block 10 are a pair of stop bars 28 and 30 which are adapted to be engaged by the actuating portion 24 of the transfer bar 20.

The manifold block 10 is provided with a plurality of outlet or delivery channels 32 communicating with reduced grooves or channels 33 which in turn communicate with the longitudinally extending groove or slot 14. The channels 32 are adapted to receive delivery conduits 34. The conduits 34 as best seen in FIGURE 2, are provided at their tops with slots 36 which receive tongues 38 on elongated cover strips 40.

In order to retain the ends of the delivery conduits 34 in the channels 32 provided in the manifold block 10, openings 42 are provided in the block adapted to receive pins 44 extending through retainer clips 46 and through openings 48 provided in the delivery conduits. Additional openings 50 are provided connecting with slots 52 and adapted to receive tangs 54 formed by slitting the ends of the clips 46 and bending the intermediate tang portion downwardly to extend through the opening 50 and thereafter bending the extending end portion to interlock with the adjacent surface of the slot.

Each of the channels 32 is provided with an independently removable cover plate 55 affording access to be inner ends of the conduits 34 and to the attaching clips 46.

It will be understood that the outlet or delivery channels formed in the block 10 are spaced apart a distance equal to the spacing between the input or supply channels 12. Also, this spacing is repeated for the nut receiving recesses 22 in the transfer bar 20. The stops 28 and 30 are spaced apart for cooperation with the depending actuating portion 24 of the transfer bar 20 such that the recesses 22 in one limiting position of the transfer bar are aligned exactly with the interior passage through the supply chutes 18, and in the other position are aligned exactly with the interior passage through the delivery conduits 34.

When the transfer bar 20 is to the right as illustrated in FIGURE 1, each of its recesses 22 will receive one of the nuts supplied through the supply chutes 16 and the parts are dimensioned so that upon longitudinal movement of the transfer bar the nuts received in the recesses 22 are freely movable into alignment with the delivery conduits. At the same time the portions of the transfer bar intermediate and adjacent the recesses 22 serve as stops to retain the remaining nuts in the supply chutes 16 from advancing until the transfer bar has been returned to its initial position.

When the transfer bar 20 has moved the nuts received in the individual recesses 22 into exact alignment with the passages through the delivery conduits 34, air is admitted to propel the individual nuts through the conduits 34. This air is admitted through air passages 56 and is supplied to chambers 58 through air conduits (not shown) extending from a pneumatic valve 60 to the chambers 58. The valve 60 is provided with an actuating plunger 61.

In order to provide for timed actuation of the air valve 60 and movement of the transfer bar 20, there is provided an air cylinder 62 carried by a bracket 64 supported from the manifold block 10. A piston within the cylinder 62 is connected to a piston rod 66 which extends freely through an opening in a block or sleeve 68 which in turn is bolted or otherwise secured as indicated at 70, to the lower end of the actuating portion 24 of the transfer bar 20. The piston rod 66 is provided with an enlarged portion 72 which engages a washer 74 constituting a spring seat. At its other end the piston rod is provided with a reduced threaded end portion receiving a nut 76 engaging a second washer 78. Intermediate the block 68 and the spring seat 74 is a compression spring 80.

With the foregoing construction it will be apparent that when the transfer bar 20 is in the right hand position as viewed in FIGURES 1 and 2 so that its recesses 22 are in alignment with the reduced inlet or supply grooves or channels 13, each of the recesses 22 will receive a single nut. At this time fluid is supplied to the cylinder 62 and the transfer bar 20 moves to the left as viewed in these figures until its depending actuating portion 24 engages the stop 28. At this time each of the nuts in the recesses 22 is in alignment with one of the reduced supply grooves or channels 33. Further movement of the transfer bar is of course prevented by the stop 28 but continued advance of the piston rod 66 is permitted, accompanied by collapse of the compression spring 80. Thereafter, the end of the piston rod engages the plunger 61 and admits air through the air passage 56 which in turn propels the individual nuts located in the recesses 22 through the delivery conduits 34.

Since the mechanism as described prevents opening of the air valves 60 until after the transfer bar 20 has completed its movement, the individual nuts received in the recesses 22 of the transfer bar 20 are in complete and exact alignment with the recesses 33 and the passages through the conduits 34. This eliminates the possibility of premature application of air which tends to cause the nuts to turn in the recesses 22 and 33 and to jam.

The drawing and the foregoing specification constitute a description of the improved nut transfer apparatus in such full, clear, concise and exact terms as to enable any person skilled in the art to practice the invention, the scope of which is indicated by the appended claims.

What I claim as my invention is:

1. Nut transfer apparatus comprising a manifold block having an elongated opening therein, a transfer bar movable longitudinally of said opening between limiting positions, said transfer bar having a plurality of nut receiving recesses formed therein, a plurality of inlet passages provided in said block each of which is in alignment with one of the recesses in said transfer bar when said transfer bar is in one limiting position, a plurality of delivery passages provided in said block and adapted to be aligned with the recesses in said transfer bar when said transfer bar is in the other limiting position, air supply means connected to supply compressed air to propel the nuts from the recesses in said transfer bar into and through said delivery passages, means for shifting the transfer bar to move the recesses and the nuts contained therein from positions in alignment with the inlet passages into positions in alignment with the delivery passages, valve means effective only after alignment with said delivery passages to supply air to the sides of the nuts opposite said delivery passages, a piston and cylinder device for effecting sequential operation of said transfer bar and said valve means, said device including a piston rod, yieldable means normally connecting said bar to said rod for movement therewith but providing for continued movement of said rod when movement of said bar is prevented, stop means acting between said block and said bar to limit movement of said bar, said valve means including a control member operable by said rod only on continued movement thereof after movement of said bar has been stopped.

2. Transfer apparatus including a carrier movable into alignment with a delivery passage, air supply means connected to deliver air under pressure to the side of said carrier remote from said delivery passage, a valve controlling said air supply means, a valve actuator, and means connecting said valve actuator to said carrier for moving said carrier, stop means for limiting movement of said carrier, and lost motion means between said carrier and actuator to provide for continued movement of said actuator to actuate said valve only after movement of said carrier has been stopped.

3. Apparatus as defined in claim 2 in which said valve actuator comprises an elongated member movable in parallelism with said carrier, said lost motion means comprising an abutment on said member, a sleeve on said carrier slidably associated with said member, a spring on said member normally retaining said sleeve against said abutment.

4. Transfer apparatus comprising means defining a pressure chamber, a delivery passage in communication with said pressure chamber, a carrier having a work piece support portion movable into and out of alignment with said chamber to position the work piece in alignment with said delivery passage, said carrier having a portion effective to close said chamber when the work piece carried thereby is in alignment with said delivery passage, air supply means connected to said chamber at the side thereof opposite said delivery passage, a valve controlling said air supply means, a valve actuator, means connecting said valve actuator to said carrier for moving said carrier as aforesaid, stop means for limiting movement of said carrier when the work piece carried thereby is in precise alignment with said delivery passage, and lost motion means between said actuator and carrier to provide for continued movement of said actuator to actuate said valve only after movement of said carrier has been stopped.

References Cited by the Examiner
UNITED STATES PATENTS

| | | | |
|---|---|---|---|
| 1,387,055 | 8/1921 | Kaase | 221—243 |
| 2,747,450 | 5/1956 | Tabet | 221—278 |
| 3,163,324 | 12/1964 | Lupo | 221—93 |

ROBERT B. REEVES, *Primary Examiner.*

WALTER SOBIN, *Examiner.*